United States Patent [19]

Edmonds, Jr. et al.

[11] 4,116,947

[45] Sep. 26, 1978

[54] BRANCHED ARYLENE SULFIDE POLYMER PRODUCTION

[75] Inventors: James T. Edmonds, Jr.; Lacey E. Scoggins, both of Bartlesville, Okla.

[73] Assignee: Phillips Petroleum Company, Bartlesville, Okla.

[21] Appl. No.: 792,172

[22] Filed: Apr. 29, 1977

[51] Int. Cl.$^2$ .............................................. C08G 75/16
[52] U.S. Cl. .................................... 528/388; 528/323; 264/331
[58] Field of Search .................................. 260/79, 79.1

[56] References Cited

U.S. PATENT DOCUMENTS

| | | | |
|---|---|---|---|
| 3,354,129 | 11/1967 | Edmonds, Jr. et al. | 260/79.1 |
| 3,790,536 | 2/1974 | Vidaurri, Jr. | 260/79.1 |
| 3,919,177 | 11/1975 | Campbell | 260/79.1 |

Primary Examiner—Melvyn I. Marquis

[57] ABSTRACT

Branched arylene sulfide polymers of low melt flow are produced by employing (1) a p-dihalobenzene, (2) a polyhalo aromatic compound having more than two halogen substituents per molecule, (3) an alkali metal sulfide, (4) an N-alkyl lactam, and (5) controlled amounts of water in the presence or absence of a sodium carboxylate. The resulting polymers without prior curing can be fabricated into shaped products having desirable properties.

16 Claims, No Drawings

BRANCHED ARYLENE SULFIDE POLYMER PRODUCTION

This invention relates to the production of branched arylene sulfide polymers. In accordance with another aspect, this invention relates to a process for the production of branched arylene sulfide polymers of low melt flow by carrying out the polymerization in the presence of controlled small amounts of water. In accordance with another aspect, this invention relates to a process for the production of branched arylene sulfide polymers having low melt flow by carrying out the polymerization in the presence of controlled small amounts of water and a sodium carboxylate. In accordance with a further aspect, this invention relates to the production of branched arylene sulfide polymers of low melt flow by carrying out the polymerization at two different temperature ranges and in the presence of controlled small amounts of water and in the presence or absence of a sodium carboxylate.

As taught in U.S. Pat. No. 3,919,177, it is known that in the production of a p-phenylene sulfide polymer by employing a p-dihalobenzene, an alkali metal sulfide, and an organic amide, the use, additionally, of an alkali metal carboxylate results in a p-phenylene sulfide polymer of higher molecular weight, as evidenced by a higher inherent viscosity and a lower melt flow, than that obtained in the absence of an alkali metal carboxylate. As taught in that same patent, it is also known that under selected conditions which include and require the use of a lithium carboxylate as the alkali metal carboxylate, the resulting p-phenylene sulfide polymer has a melt flow such that the polymer can be melt spun into fibers without prior curing. Now a process has been discovered for the production of a branched arylene sulfide polymer which can be molded, extruded, or spun into fibers without prior curing, which process does not require use of a lithium carboxylate or other relatively expensive source of lithium.

Accordingly, it is an object of this invention to provide an improved process for the production of branched arylene sulfide polymers.

A further object of the invention is to provide branched arylene sulfide polymers of low melt flow.

A further object of the invention is to provide branched arylene sulfide polymers which can be molded, extruded, or spun into fibers without prior curing.

A still further object of the invention is to provide a commercially feasible process for the production of branched arylene sulfide polymers of low melt flow.

Other objects, aspects, and the several advantages of the invention will be apparent to those skilled in the art upon a study of the specification and the appended claims.

In accordance with the invention, branched arylene sulfide polymers of low melt flow which can be molded, extruded, or spun into fibers without prior curing are produced by carrying out the polymerization in the presence of controlled small amounts of water in the presence or absence of at least one sodium carboxylate.

In accordance with this invention, a branched arylene sulfide polymer of low melt flow is produced by employing (1) a p-dihalobenzene, (2) a polyhalo aromatic compounds having more than two halogen substitutents per molecule, (3) an alkali metal sulfide, (4) an N-alkyl lactam, and (5) one member selected from the group consisting of (a) water, including water of hydration, in an amount of about 1.2 moles to about 2.4 moles per mole of alkali metal sulfide, and (b) water, including water of hydration, in an amount of about 1.0 mole to about 2.4 moles per mole of alkali metal sulfide, and a sodium carboxylate. The resulting polymers, without prior curing, can be molded, extruded, or spun into fibers.

In one embodiment of the present invention, at least one p-dihalobenzene, at least one polyhalo aromatic compound having more than two halogen substituents per molecule, at least one alkali metal sulfide, at least one N-alkyl lactam, and water, including water of hydration, in an amount of about 1.2 moles to about 2.4 moles per mole of alkali metal sulfide employed are contacted under polymerization conditions for a period of time sufficient to form an arylene sulfide polymer having a melt flow as described hereinafter.

In another embodiment of this invention, at least one p-dihalobenzene, at least one polyhalo aromatic compound having more than two halogen substituents per molecule, at least one alkali metal sulfide, at least one N-alkyl lactam, at least one sodium carboxylate, and water, including water of hydration, in an amount of about 1.0 mole to about 2.4 moles per mole of alkali metal sulfide employed are contacted under polymerization conditions for a period of time sufficient to form an arylene sulfide polymer having a melt flow as described hereinafter.

In yet another embodiment of this invention, a mixture produced by dehydration of an admixture of at least one alkali metal sulfide in hydrated form or as an aqueous mixture and at least one N-alkyl lactam, thereby resulting in removal of all but one mole of water per mole of alkali metal sulfide employed, is contacted with a mixture of at least one p-dihalobenzene, at least one polyhalo aromatic compound having more than two halogen substituents per molecule, and water in an amount of about 0.2 mole to about 1.4 moles per mole of alkali metal sulfide employed, under polymerization conditions for a period of time sufficient to form a branched arylene sulfide polymer having a melt flow as described hereinafter.

In still another embodiment of this invention, a mixture produced by dehydration of an admixture of at least one alkali metal sulfide in hydrated form or as an aqueous mixture, at least one sodium carboxylate, and at least one N-alkyl lactam, thereby resulting in removal of all but one mole of water per mole of alkali metal sulfide employed, is contracted with a mixture of at least one p-dihalobenzene, at least one polyhalo aromatic compound having more than two halogen substituents per molecule, and water in an amount of 0.0 to about 1.4 moles per mole of alkali metal sulfide employed, under polymerization conditions for a period of time sufficient to form a branched arylene sulfide polymer having a melt flow as described hereinafter.

p-Dihalobenzenes which can be employed in the process of this invention can be represented by the formula

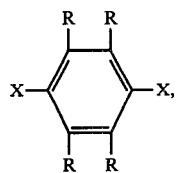

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhalo aromatic compounds having more than two halogen substituents per molecule which can be employed in the process of this invention can be represented by the formula $R^1X_n$, where each X is selected from the group consisting of chlorine, bromine, and iodine, n is an integer of 3 to 6, and $R^1$ is a polyvalent aromatic radical of valence n which can have up to about 4 methyl substituents, the total number of carbon atoms in $R^1$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-[5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. If desired, the alkali metal sulfide can be produced by reaction of hydrogen sulfide or sodium bisulfide with sodium hydroxide in an aqueous medium. However, when the amount of free water and/or water of hydration present exceeds that specified hereinabove, excess water must be removed, e.g., by distillation, prior to the polymerization step.

N-Alkyl lactams which can be employed in the process of this invention can be represented by the formula

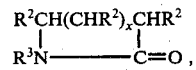

where each $R^2$ is selected from the group consisting of hydrogen and $R^3$, $R^3$ is an alkyl radical having 1 to about 3 carbon atoms, x is an integer of 1 to 3, and the total number of carbon atoms in the N-alkyl lactam is within the range of about 5 to about 10.

Examples of some N-alkyl lactams which can be employed in the process of this invention include N-methyl-2-pyrrolidone, N-ethyl-2-pyrrolidone, N-isopropyl-2-pyrrolidone, N,3-dimethyl-2-pyrrolidone, N-Propyl-5-methyl-2-pyrrolidone, N,3,4,5-tetramethyl-2-pyrrolidone, N-isopropyl-4-propyl-2-pyrrolidone, N-methyl-2-piperiodone, N,6-diethyl-2-piperidone, N-methyl-5-isopropyl-2-piperidone, N-methyl-3-ethyl-2-piperidone, N-methyl-2-oxohexamethylenimine, N-ethyl-2-oxohexamethylenimine, N-methyl-2-oxo-5-ethylhexamethylenimine, N-propyl-2-oxo-5-methylhexamethylenimine, N-methyl-2-oxo-3-propylhexamethylenimine, N-methyl-2-oxo-7-isopropylhexamethylenimine, and the like, and mixtures thereof.

Sodium carboxylates which can be employed in the process of this invention can be represented by the formula $R^4CO_2Na$, where $R^4$ is a hydrocarbyl radical selected from alkyl, cycloalkyl, and aryl, and combinations thereof such as alkaryl, aralkyl, and the like, and the number of carbon atoms in $R^4$ is within the range of 1 to about 20. If desired, the sodium carboxylate can be employed as a hydrate or as a solution or dispersion in water. However, if the total amount of free water and/or water of hydration present, including that associated with the alkali metal sulfide, exceeds the amount specified hereinabove, excess water must be removed, e.g., by distillation, prior to the polymerization step.

Examples of some sodium carboxylates which can be employed in the process of this invention include sodium acetate, sodium propionate, sodium 2-methylpropionate, sodium butyrate, sodium valerate, sodium hexanoate, sodium heptanoate, sodium 2-methyloctanoate, sodium dodecanoate, sodium 4-ethyltetradecanoate, sodium octadecanoate, sodium heneicosanoate, sodium cyclohexanecarboxylate, sodium cyclododecanecarboxylate, sodium 3-methylcyclopentanecarboxylate, sodium cyclohexylacetate, sodium benzoate, sodium m-toluate, sodium phenylacetate, sodium 4-phenylcyclohexanecarboxylate, sodium p-tolylacetate, sodium 4-ethylcyclohexylacetate, and the like, and mixtures thereof.

Although the mole ratio of p-dihalobenzene to alkali metal sulfide can vary somewhat, generally it will be within the range of about 0.98:1 to about 1.03:1, preferably within the rage of about 0.99:1 to about 1.02:1. The mole ratio of polyhalo aromatic compound having more than two halogen substituents per molecule to alkali metal sulfide can vary considerably, depending in part on the halogen content of said polyhalo aromatic compound and on the water and sodium carboxylate content of the polymerization system, but generally will be within the range of about 0.0002:1 to about 0.014:1, preferably within the range of about 0.001:1 to about 0.012:1. The mole ratio of sodium carboxylate, when used, to alkali metal sulfide can vary over a wide range, but generally will be within the range of about 0.05:1 to about 1.5:1, preferably within the range of about 0.1:1 to about 0.8:1. The mole ratio of N-alkyl lactam to alkali metal sulfide can vary considerably, but generally will be within the range of about 2:1 to about 10:1, preferably within the range of about 3:1 to about 6:1.

Although the reaction temperature at which the polymerization is conducted can vary over a wide range, generally it will be within the range of about 180° C to about 285° C, preferably within the range of about 190° C to about 275° C. The reaction time can vary greatly, depending in part on the reaction temperature, but generally will be within the range of about 1 hour to about 60 hours, preferably within the range of about 2 hours to about 10 hours. In a presently preferred procedure, the polymerization is conducted within a first temperature range of about 180° C to about 245° C, preferably about 190° C to about 245° C, and then within a second temperature range of about 245° C to about 285° C, preferably about 245° C to about 275° C, the total reaction time for the polymerization in these two temperature ranges being within the range of about 1 hour to about 60 hours, preferably about 2 hours to about 10 hours, about 15 percent to about 70 percent of which time is within the first temperature range, the temperature during at least 50 percent of the reaction time in the first temperature range being at least 20° C below the final temperature in the second temperature range. Here, too, the reaction times are dependent, in part, on the reaction temperatures. In either or both of the temperature ranges, the temperature can be increased continuously or maintained predominantly at selected levels within relatively restricted temperature limits.

The pressure at which the polymerization reaction is conducted should be sufficient to maintain the p-dihalobenzene, the polyhalo aromatic compound having more than two halogen substituents per molecule, the N-alkyl lactam, and the water substantially in the liquid phase.

The process of this invention can be carried out by mixing the p-dihalobenzene, the polyhalo aromatic compound having more than two halogen substituents per molecule, the alkali metal sulfide, the N-alkyl lactam, the water, including water of hydration, and the sodium carboxylate, if used, in any order. If more than the desired amount of water, in the form of free water and/or water of hydration is present in the mixture or any component of the mixture, any water in excess of the desired amount can be removed, e.g., by distillation. Such excess water can be removed from the component with which the water is initially associated, e.g., the alkali metal sulfide or the sodium carboxylate, or from a mixture of two or more of the essential ingredients. For example, water can be removed from a mixture of N-alkyl lactam and hydrated alkali metal sulfide, optionally containing free water and/or alkali metal carboxylate which itself can be employed in anhydrous or hydrated form or as a solution. If the amount of water removed is greater than desired, water can then be added as required to provide the quantity of water desired. When the above dehydration step is employed, it is preferable to add the p-dihalobenzene and the polyhalo aromatic compound having more than two halogen substituents per molecule after the dehydration step.

Although the polyhalo aromatic compound having more than two halogen substituents per molecule can be charged to the polymerization reactor at substantially the same time as the p-dihalobenzene, it is also within the scope of this invention to add said polyhalo aromatic compound, incrementally or all at once, to the polymerization reactor during the course of the polymerization, after polymerization of the p-dihalobenzene has begun.

The branched arylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer. Alternatively, N-alkyl lactam can be recovered by distillation from the reaction mixture prior to washing with water. When this latter procedure is employed, and the N-alkyl lactam is distilled at elevated temperatures, e.g., above 200° C, it is preferable that carbon dioxide be added during the polymerization reaction or upon completion of the polymerization reaction, but prior to distillation of the N-alkyl lactam, to inhibit decomposition of the branched arylene sulfide polymer during distillation of the N-alkyl lactam.

The melt flow of the branched arylene sulfide polymers produced by the method of this invention should be within the range of about 1 to about 700, preferably about 2 to about 200 (determined by the method of ASTM D 1238-70, modified to a temperature of 316° C using a 5-kg weight, the value being expressed as g/10 min.), since such polymers can be fabricated, without prior curing, into shaped products having desirable properties. Thus, the usual curing step to which poly(p-phenylene sulfide) is subjected is obviated. Therefore, without prior curing, the branched polymers produced by the process of this invention can be extruded into sheet, film, pipe, or profiles; spun into fibers; or blow molded, injection molded, rotational molded, or compression molded into desired shapes. The branched polymers also can be used in the production of coatings. If desired, the branched polymers can be blended with fillers, pigments, extenders, other polymers, and the like. For example, fiber glass can be added to the polymers to improve physical properties such as tensile strength, flexural modulus, and impact resistance. If desired, the polymers in shaped form can be annealed to improve physical properties such as flexural modulus, flexural strength, tensile strength, and heat deflection temperature.

EXAMPLES

In a series of runs, Examples 4 through 20 and Example 22, branched poly(phenylene sulfide) (branched PPS) was prepared by a process within the scope of this invention. Example 21, which is outside the scope of this invention, represents a run in which branched PPS was produced through use of too much water. In Examples 4 through 21 the branched PPS was prepared in the following manner. To a 2-gallon autoclave equipped with stirrer were charged 7.765 moles hydrated sodium sulfide (about 60 percent assay), sufficient sodium hydroxide to react with sodium bisulfide present as impurity in the sodium sulfide, 31.05 moles N-methyl-2-pyrrolidone (NMP), and 0.00 or 0.15 mole anhydrous sodium acetate per mole sodium sulfide employed. The autoclave was then flushed with nitrogen and all but one mole of the water of hydration per mole of sodium sulfide was removed by distillation at atmospheric pressure from the resulting mixture by heating the mixture to a temperature of 204°–215° C, the distillate thus obtained comprising primarily water, together with a minor amount of NMP. To the residual mixture were added 1.00 mole p-dichlorobenzene (DCB) per mole sodium sulfide employed, 0.006 or 0.008 mole 1,2,4-trichlorobenzene (TCB) per mole sodium sulfide employed, an amount of water within the range of 0.00 to 1.50 moles per mole sodium sulfide, and 5.18 moles NMP. The resulting mixture was heated, under autogenous pressure, at 204°–205° C for 2 hours and then at 265°–266° C for 3 hours. The reaction product was then cooled, washed with hot water, and dried to obtain the desired branched PPS. Example 22 was conducted in the same manner except that after the distillation step to remove water, 1.00 mole DCB per mole sodium sulfide employed, 0.50 mole water per mole sodium sulfide employed, and 4.14 moles NMP were added to the residual mixture. The resulting mixture was heated, under autogenous pressure, at 204° C for 2 hours and then at 266° C for 1 hour, at which time 0.008 mole TCB per mole sodium sulfide employed and 1.04 moles NMP were added, and heating at 266° C was continued for an additional 2 hours. The resulting reaction product was cooled, washed with hot water, and dried to obtain the desired branched PPS.

Examples 2 and 3 represent control runs outside the scope of this invention, for the preparation of branched PPS. These control runs were conducted as described for Examples 4 through 21 except that neither sodium acetate nor free water was added prior to the polymerization step. Example 1 represents a control run outside the scope of this invention, for the preparation of linear PPS, this control run being carried out as described for Examples 4 through 21 except that neither TCB, sodium acetate, nor water was added prior to the polymerization step.

The relative molar proportions of sodium sulfide, DCB, TCB, sodium acetate, and water used in each of the Examples are shown in Table I, together with the melt flow of each of the polymer products. The relative molar proportion of water shown in the Table includes the one mole of water of hydration per mole of hydrated sodium sulfide employed which was not removed during the distillation step. The values for melt flow were determined by the method of ASTM D 1238-70, modified to a temperature of 316° C using a 5-kg weight, the value being expressed as g/10 min.

TABLE I

| Example | Relative Molar Proportions | | | | | Melt Flow of Polymer, g/10 min. |
|---|---|---|---|---|---|---|
| | Na$_2$S | DCB | TCB | NaOAc | H$_2$O | |
| 1 | 1.00 | 1.00 | 0.00 | 0.00 | 1.00 | 2545 |
| 2 | 1.00 | 1.00 | 0.008 | 0.00 | 1.00 | 740 |
| 3 | 1.00 | 1.00 | 0.008 | 0.00 | 1.00 | 1100 |
| 4 | 1.00 | 1.00 | 0.008 | 0.00 | 1.25 | 389 |
| 5 | 1.00 | 1.00 | 0.008 | 0.00 | 1.25 | 488 |
| 6 | 1.00 | 1.00 | 0.008 | 0.00 | 1.50 | 74.6 |
| 7 | 1.00 | 1.00 | 0.008 | 0.00 | 1.50 | 126 |
| 8 | 1.00 | 1.00 | 0.008 | 0.00 | 1.50 | 1138* |
| 9 | 1.00 | 1.00 | 0.008 | 0.00 | 1.75 | 31.9 |
| 10 | 1.00 | 1.00 | 0.008 | 0.00 | 1.75 | 60.8 |
| 11 | 1.00 | 1.00 | 0.008 | 0.00 | 2.00 | 38 |
| 12 | 1.00 | 1.00 | 0.008 | 0.00 | 2.00 | 112 |
| 13 | 1.00 | 1.00 | 0.008 | 0.00 | 2.00 | 242 |
| 14 | 1.00 | 1.00 | 0.006 | 0.00 | 1.50 | 71 |
| 15 | 1.00 | 1.00 | 0.006 | 0.00 | 1.50 | 126 |
| 16 | 1.00 | 1.00 | 0.006 | 0.15 | 1.00 | 492 |
| 17 | 1.00 | 1.00 | 0.006 | 0.15 | 1.25 | 209 |
| 18 | 1.00 | 1.00 | 0.006 | 0.15 | 1.50 | 20.4 |
| 19 | 1.00 | 1.00 | 0.006 | 0.15 | 1.75 | 15.0 |
| 20 | 1.00 | 1.00 | 0.006 | 0.15 | 2.002 | 30.9 |
| 21 | 1.00 | 1.00 | 0.006 | 0.15 | 2.50 | 724 |
| 22 | 1.00 | 1.00 | 0.008 | 0.00 | 1.50 | 3.9 |

*Reason for this particularly high value is unknown.

Thus, the polymer products obtained in Examples 4 through 20 and Example 22 by the process of this invention generally had a melt flow within the desired range of about 1 to about 700 g/10 min. and generally were of lower melt flow than those obtained in Examples 1 through 3 and Example 21 by processes outside the scope of this invention, the only exception being the polymer in Example 8, which, upon consideration of Examples 6 and 7 conducted in like manner, must have involved an error.

We claim:

1. A process for the production of branched arylene sulfide polymers having a melt flow sufficiently low that the resulting polymers can be fabricated without prior curing into shaped products having desirable properties, which process comprises contacting:
   (1) at least one p-dihalobenzene;
   (2) at least one polyhalo aromatic compound having more than two halogen substituents per molecule;
   (3) at least one alkali metal sulfide;
   (4) at least one N-alkyl lactam; and
   (5) one member selected from the group consisting of:
      (a) water in an amount of about 1.2 moles to about 2.4 moles per mole of alkali metal sulfide, and
      (b) at least one sodium carboxylate and water in an amount of about 1.0 mole to about 2.4 moles per mole of alkali metal sulfide;
   under polymerization conditions of temperature and for a period of time sufficient to form a branched arylene sulfide polymer having a low melt flow of about 1 to about 700.

2. A process according to claim 1 wherein:
   (1) is a p-dihalobenzene represented by the formula

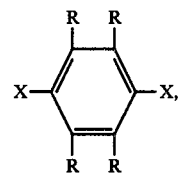

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen;
   (2) is a polyhalo aromatic compound represented by the formula R$^1$X$_n$, where each X is selected from the group consisting of chlorine, bromine, and iodine, $n$ is an integer of 3 to 6, and R$^1$ is a polyvalent aromatic radical of valence $n$ which can have up to about 4 methyl substituents, the total number of carbon atoms in R$^1$ being within the range of 6 to about 16;
   (3) is selected from sodium sulfide, potassium sulfide, rubidium sulfide, cesium sulfide, and mixtures thereof;
   (4) is an N-alkyl lactam represented by the formula

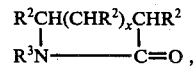

where each R$^2$ is selected from the group consisting of hydrogen and R$^3$, R$^3$ is an alkyl radical having 1 to about 3 carbon atoms, $x$ is an integer of 1 to 3, and the total number of carbon atoms in the N-alkyl lactam is within the range of about 5 to about 10; and (5) is:
(a) water, or
(b) water and a sodium carboxylate represented by the formula $R^4CO_2Na$, where $R^4$ is a hydrocarbyl radical selected from alkyl, cycloalkyl, and aryl, and combinations thereof such as alkaryl, aralkyl, and the like, and the number of carbon atoms in $R^4$ is within the range of 1 to about 20.

3. A process according to claim 1 wherein the mole ratio of (1) to (3) is within the range of about 0.98:1 to about 1.03:1, the mole ratio of (2) to (3) is within the range of about 0.0002:1 to about 0.014:1, the mole ratio of (4) to (3) is within the range of about 2:1 to about 10:1, the mole ratio of sodium carboxylate, when used, to (3) is within the range of about 0.05:1 to about 1.5:1, and the polymerization temperature is within the range of about 180° C to about 285° C.

4. A process according to claim 1 wherein the polymerization is carried out at two different temperature levels wherein the polymerization is conducted within a first temperature range of about 180° C to about 245° C and then within a second temperature range of about 245° C to about 285° C with the proviso that about 15 percent to about 70 percent of the total reaction time is within the first temperature range and the temperature during at least 50 percent of the reaction time in the first temperature range is at least 20° C below the final temperature in the second temperature range.

5. A process according to claim 1 wherein (2) is added during polymerization after the polymerization of (1) has begun.

6. A process according to claim 1 wherein:
(1) is p-dichlorobenzene (DCB),
(2) is 1,2,4-trichlorobenzene (TCB),
(3) is sodium sulfide,
(4) is N-methyl-2-pyrrolidone (NMP), and
(5) is (b) water and sodium acetate.

7. A process according to claim 5 wherein:
(1) is p-dichlorobenzene (DCB),
(2) is 1,2,4-trichlorobenzene (TCB),
(3) is sodium sulfide,
(4) is N-methyl-2-pyrrolidone (NMP), and
(5) is (a) water.

8. A process for producing branched arylene sulfide polymers comprising:
(a) contacting
(1) at least one alkali metal sulfide in hydrated form or in an aqueous mixture, and
(2) at least one N-alkyl lactam to form a first composition;
(b) heating said first composition obtained in (a) under conditions sufficient to remove all but one mole of water per mole of alkali metal sulfide employed and form a dehydrated composition;
(c) contacting at least a portion of said dehydrated composition with:
(3) at least one p-dihalobenzene,
(4) at least one polyhalo aromatic compound having more than two halogen substituents per molecule, and
(5) one member selected from the group consisting of
(A) water in an amount of about 0.2 mole to about 1.4 moles per mole of alkali metal sulfide, and (B) at least one sodium carboxylate and water, including water of hydration, in an amount of 0.0 mole to about 1.4 moles per mole of alkali metal sulfide
to form a second composition; and
(d) maintaining at least a portion of said second composition at polymerization conditions of temperature and for a period of time sufficient to form a branched arylene sulfide polymer having a low melt flow of about 1 to about 700.

9. A process according to claim 8 wherein (4) is added during polymerization after the polymerization of (3) has begun.

10. A process according to claim 8 wherein the polymerization is carried out at two different temperature levels wherein the polymerization is conducted within a first temperature range of about 180° C to about 245° C and then within a second temperature range of about 245° C to about 285° C with the proviso that about 15 percent to about 70 percent of the total reaction time is within the first temperature range and the temperature during at least 50 percent of the reaction time in the first temperature range is at least 20° C below the final temperature in the second temperature range.

11. A process according to claim 8 wherein:
(1) is sodium sulfide,
(2) is N-methyl-2-pyrrolidone (NMP),
(3) is p-dichlorobenzene (DCB),
(4) is 1,2,4-trichlorobenzene (TCB), and
(5) is (A) water.

12. A process according to claim 9 wherein:
(1) is sodium sulfide,
(2) is N-methyl-2-pyrrolidone (NMP),
(3) is p-dichlorobenzene (DCB),
(4) is 1,2,4-trichlorobenzene (TCB), and
(5) is (A) water.

13. A process for producing branched arylene sulfide polymers comprising:
(a) contacting
(1) at least one alkali metal sulfide in hydrated form or in an aqueous mixture,
(2) at least one N-alkyl lactam, and
(3) at least one sodium carboxylate to form a first composition;
(b) heating said first composition obtained in (a) under conditions sufficient to remove all but one mole of water per mole of alkali metal sulfide employed and form a dehydrated composition;
(c) contacting at least a portion of said dehydrated composition with
(4) at least one p-dihalobenzene,
(5) at least one polyhalo aromatic compound having more than two halogen substituents per molecule, and
(6) water in an amount of 0.0 mole to about 1.4 moles per mole of alkali metal sulfide to form a second composition; and
(d) maintaining at least a portion of said second composition at polymerization conditions of temperature and for a period of time sufficient to form a branched arylene sulfide polymer having a low melt flow of about 1 to about 700.

14. A process according to claim 13 wherein the polymerization is carried out at two different temperature levels wherein the polymerization is conducted within a first temperature range of about 180° C to about 245° C and then within a second temperature range of about 245° C to about 285° C with the proviso that about 15 percent to about 70 percent of the total reaction time is within the first temperature range and the temperature during at least 50 percent of the reaction time in the first temperature range is at least 20° C below the final temperature in the second temperature range.

15. A process according to claim 13 wherein:
(1) is sodium sulfide,
(2) is N-methyl-2-pyrrolidone (NMP),
(3) is sodium acetate,
(4) is p-dichlorobenzene (DCB), and
(5) is 1,2,4-trichlorobenzene (TCB).

16. A process according to claim 13 wherein (5) is added during polymerization after the polymerization of (4) has begun.

* * * * *